(12) United States Patent
Henderson et al.

(10) Patent No.: US 7,325,227 B2
(45) Date of Patent: Jan. 29, 2008

(54) SYSTEM, METHOD, AND COMPUTER PROGRAM PRODUCT FOR IDENTIFYING CODE DEVELOPMENT ERRORS

(75) Inventors: Barnaby Henderson, Milton (GB); Paul Elliot, St. Neots (GB)

(73) Assignee: Siemens Product Lifecycle Management Software

( * ) Notice: Subject to any disclaimer, the term of this patent is extended or adjusted under 35 U.S.C. 154(b) by 556 days.

(21) Appl. No.: 10/706,849

(22) Filed: Nov. 12, 2003

(65) Prior Publication Data

US 2005/0102653 A1    May 12, 2005

(51) Int. Cl.
G06F 9/44    (2006.01)

(52) U.S. Cl. .................. 717/126; 717/130; 714/38

(58) Field of Classification Search ............ None
See application file for complete search history.

(56) References Cited

U.S. PATENT DOCUMENTS

| | | | |
|---|---|---|---|
| 5,634,098 A | | 5/1997 | Janniro et al. |
| 5,675,803 A | * | 10/1997 | Preisler et al. .............. 717/131 |
| 5,966,541 A | * | 10/1999 | Agarwal .................... 717/132 |
| 6,141,698 A | * | 10/2000 | Krishnan et al. ........... 719/331 |
| 6,681,383 B1 | | 1/2004 | Pastor et al. |
| 2004/0107416 A1 | * | 6/2004 | Buban et al. ............... 717/170 |

OTHER PUBLICATIONS

Colin Moock: "Actionscript for Flash MX: The Definitive Guide, Second Edition, Chapter 19", Dec. 19, 2001, O'Reilly Media, Inc. pp. 402-414.

D. Greer: "How to Debug a Program", The "SMUG" Book, [Online], Mar. 29, 2001, pp. 1-2.

* cited by examiner

*Primary Examiner*—Tuan Dam
*Assistant Examiner*—Chuck Kendall

(57) ABSTRACT

A preferred embodiment provides a system, method, and computer program product for software code testing. When a code change causes a regression, the system tests each modification to determine and isolate the cause of the regression.

22 Claims, 4 Drawing Sheets

SYSTEM, METHOD, AND COMPUTER PROGRAM PRODUCT FOR IDENTIFYING CODE DEVELOPMENT ERRORS

TECHNICAL FIELD OF THE INVENTION

The present invention is generally related to software development and testing.

BACKGROUND OF THE INVENTION

Product testing requires a large number of tests to be run, and each test result must be stored. For example, one software product in development can require a set of 16,500 tests to be regularly run to ensure proper operation. These tests can take 15 hours to run using one test machine. If a developer makes a code change there is the distinct possibility that one or more of the 16,500 tests will regress. Experience has shown that if the developers do not run the tests over their changed code on one day, they are highly likely to have a significant number of regressions to deal with the next day, and product development and release schedules will suffer.

If a test regresses it is the responsibility of a test engineer to determine what code change has caused the regression. This involves running the failing test over recompiled copies of the product, where each copy has had one or more of the code changes removed, to see if this causes the test to pass. If a code change is "backed off", and the test subsequently passes, the code causing the regression has been found, and the relevant developer can be notified in order to fix it.

Typically the above process can take up to half an hour per regression due to the number of recompilations required, so if there are many regressions the assigned test engineer can spend a whole day resolving the regressions caused during the previous night's test run.

There is, therefore, a need in the art for a system, process and computer program product for efficiently and automatically identifying the cause of code regressions.

SUMMARY OF THE INVENTION

A preferred embodiment provides a system, method, and computer program product for software code testing. When a code change causes a regression, the system tests each modification to determine and isolate the cause of the regression.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device. The numerous innovative teachings of the present application will be described with particular reference to the presently preferred embodiment.

A preferred embodiment provides a system, method, and computer program product for software code testing. When a code change causes a regression, the system tests each modification to determine and isolate the cause of the regression.

Figure 1:
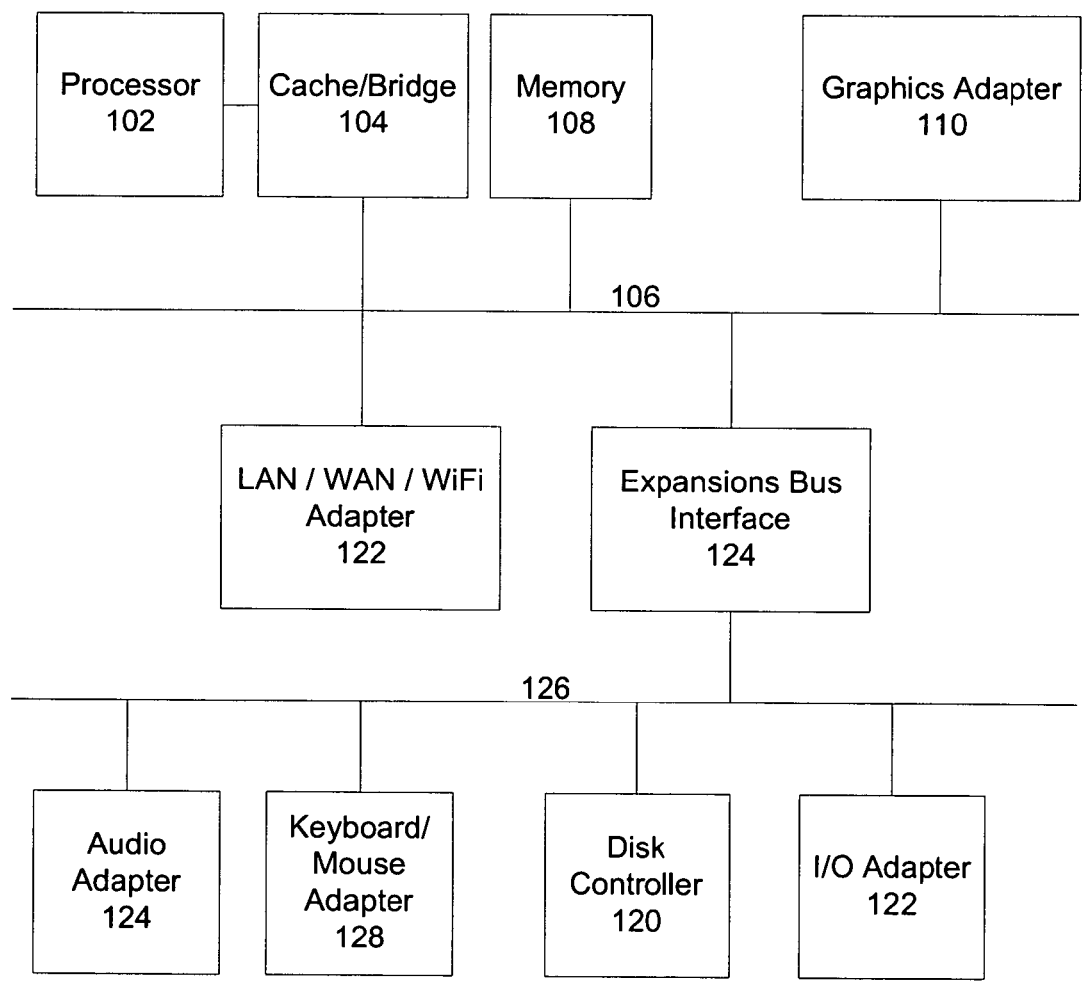
FIG. 1 depicts a block diagram of a data processing system in which a preferred embodiment can be implemented.

FIG. 1 depicts a block diagram of a data processing system in which a preferred embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 416 is connected to keyboard/mouse adapter 118, disk controller 120, and I/O adapter 122.

Also connected to I/O bus 116 in the example shown is audio adapter 124, to which speakers (not shown) may be connected for playing sounds. Keyboard/mouse adapter 418 provides a connection for a pointing device (not shown), such as a mouse, trackball, trackpointer, etc.

Those of ordinary skill in the art will appreciate that the hardware depicted in FIG. 1 may vary for particular. For example, other peripheral devices, such as an optical disk drive and the like, also may be used in addition or in place of the hardware depicted. The depicted example is provided for the purpose of explanation only and is not meant to imply architectural limitations with respect to the present invention.

A data processing system in accordance with a preferred embodiment of the present invention includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present invention as described.

Following is a description of the process used to test for code change regression. In this discussion, an exemplary dynamic link library (DLL) is described. This DLL is comprised of one or more modules or module directories, and each module or module directory is comprised of one or more specific files. These concepts are known to those of skill in the art, and the skilled artisan will recognize that other code structures and formats can also be tested using the principles described herein.

As a software system is developed or upgraded, multiple files, functions, or routines are modified by the developer. After modification, these modified files are compiled into a new DLL file, and replace the previous version of the corresponding files. In this discussion, it is assumes that the original DLL was functioning and testing properly, which indicates that the files and modules of which it is comprised are also working properly. Often, due to some programming error, the new DLL, compiled using at least some modified files and routines, will fail to perform properly or pass software tests.

The modules and files of the original DLL are then each known to function properly, and one or more of the modified modules or files can be defective.

When a newly-modified DLL ("NewDLL") fails, the tests are rerun with the most recent known-good DLL ("Good-DLL") to verify that the test failures are actually genuine, and not due to a network glitch or an instability in the testing platform. The tests are also rerun using NewDLL to ensure that the failure is repeatable, and thus due to a regression in NewDLL. A list of the tests that have failed is stored.

When it is clear that the code changes in NewDLL are the cause of the error, all the files that have been changed from one build to the next are placed in a list through an automated process, known to those of skill in the art, along with the function and module they affect, and the user or developer that made the change.

Next, the changed files are preferably sorted into groups by any chosen criteria, such as per-module, by function, or by the user or developer that made the change. These sets of files are used to find the regression more efficiently, but alternate embodiments provide that each changed file is tested individually. In this example, the files are sorted into sets according to the developer that modified each file.

Next, for each of the sets of modified files, a new test process is run. In this process, a new DLL ("TestDLL") is compiled which is the same as NewDLL, except that the set of modified files being tested is not included, with the corresponding original files being used instead.

Figure 2:
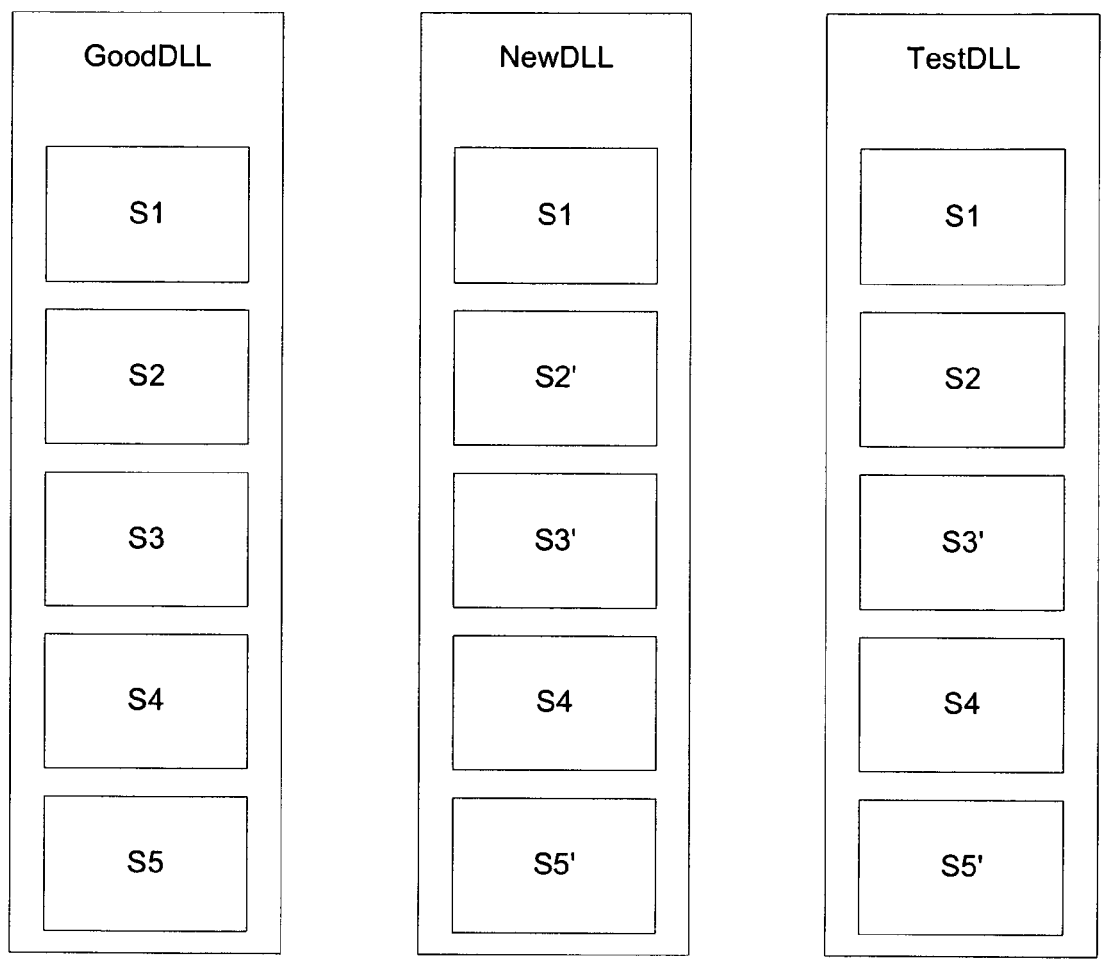
FIG. 2 shows a block diagram of a exemplary dynamic link libraries, in accordance with an embodiment of the invention.

That is, assume GoodDLL has known-good sets S1, S2, S3, S4, and S5, and NewDLL has sets S1, S2', S3', S4, and S5', where S2' is a modified version of S2, S3' is a modified version of S3, and S5' is a modified version of S5. When S2' is to be validated, a new DLL TestDLL is compiled using S1, S2, S3', S4, and S5'. TestDLL is therefore the same as NewDLL except the set to be tested, S2', has been replaced with known-good set S2. FIG. 2 shows a block diagram of an exemplary GoodDLL, NewDLL, and TestDLL.

TestDLL is then tested, using one or more software tests, as above. In particular, tests are performed that failed when testing NewDLL and are specific to the functions, routines, files, and modules in the set being tested, S2'. If these tests now pass, using the original S2 in place of S2' in TestDLL, it is determined that there is necessarily an error in S2' (and not in S2).

If the tests still fail, then S2' is either not the problem, or is not the only problem.

This process is repeated for each set, compiling a new TestDLL each time, and noting the sets that are determined to have errors.

Next, for each set that is determined to have errors, a similar process is repeated for each individual file in that process. That is, a TestDLL is compiled that corresponds to NewDLL except that one modified file in the modified set, S2' in this example, is replaced with the original file. If the new TestDLL passes the test, then that particular modified file is causing the error.

This process allows the developers to quickly identify first the set of files that contains the regression, then the specific files within the set that have the error.

Figure 3:
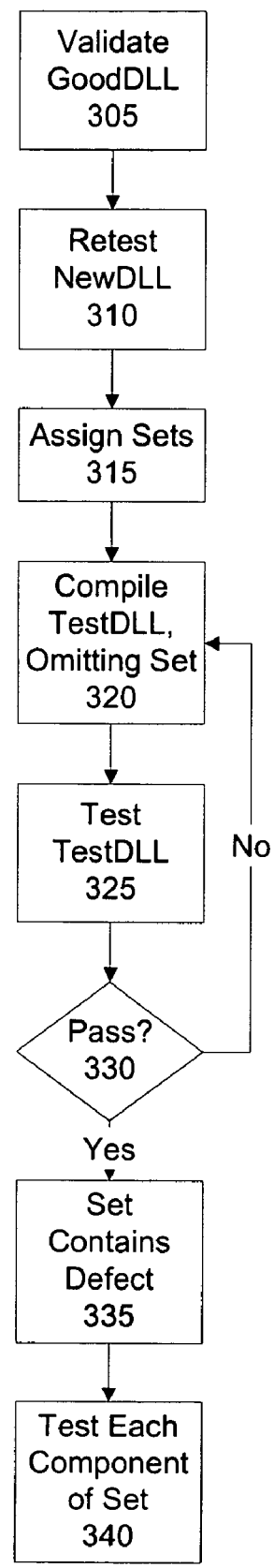
FIG. 3 depicts a flowchart of a process in accordance with an embodiment of the invention.

FIG. 3 depicts a flowchart of a process in accordance with the preferred embodiment. Here, it is presumed that Good-DLL, comprising known-good modules, functions, and files, is known to be good, and NewDLL, comprising at least some modified modules, functions, and files, has failed a test. The skilled artisan will recognize that not all steps need be performed in any particular order.

First, GoodDLL is validated to ensure that it still passes the tests (step 305). Next, NewDLL is retested to verify that the test is repeatable (step 310).

Next, the modules, functions, or files comprising the DLL are assigned to different sets, according to any suitable criteria, as discussed above (step 315).

Next, a TestDLL is compiled, corresponding to NewDLL, except that one of the sets is replaced with the corresponding set from the GoodDLL (step 320).

Next, the TestDLL is tested (step 325). If the test does not pass (step 330), then a new TestDLL is compiled using the next suspect set (returning to step 320).

If it passes (step 330), then the omitted set is determined to contain a defective component (step 335), and each module, file, or function in the set is then tested (step 340).

Figure 4:
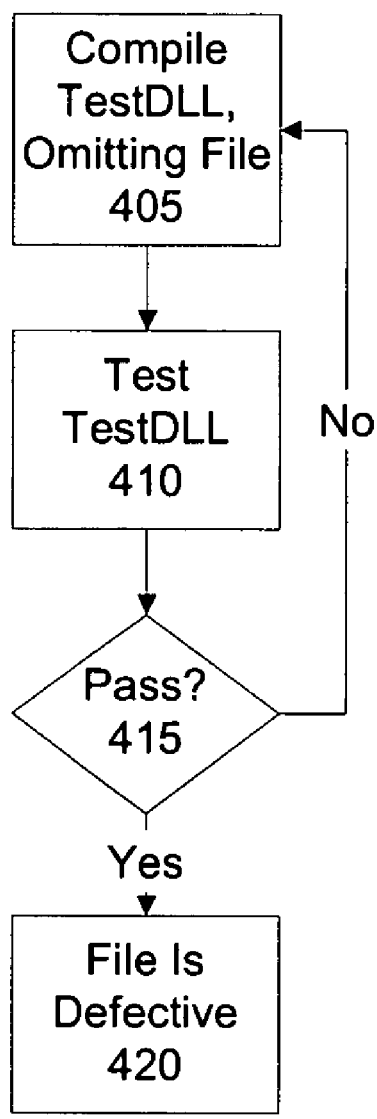
FIG. 4 depicts a flowchart of a process in accordance with an embodiment of the invention.

FIG. 4 depicts a flowchart of a process in accordance with a preferred embodiment, for testing each component in a set. Here, the components are referred to as files, but the testing can be done in accordance with any specific file, module, or function that can be inserted or omitted from the DLL as specified.

Here, a TestDLL is compiled, corresponding to NewDLL, except that one of the files from the defective set is replaced with the corresponding file from the GoodDLL (step 405).

Next, the TestDLL is tested (step 410). If the test does not pass (step 415), then a new TestDLL is compiled using the next file in the defective set (returning to step 405).

If it passes (step 415), then the omitted file is determined to contain be defective (step 420).

As used herein, "compiled" is broadly used to indicate any compiling, linking, assembling, or other processing of the modules, functions, and files into a form that can be executed and/or tested. Further, while the dynamic link libraries (DLLs) are discussed herein, the skilled artisan will recognize that any executable and testable computer program or program component can be similarly tested using the techniques disclosed herein.

Those of skill in the art will recognize modifications, variations, and improvements that can be made to the disclosed embodiments. For example, one alternate embodiment instead checks which code changes result in fixes. Another embodiment includes backing off different combinations of modules or files in order to determine whether a regression was caused by a combination of changes. Another embodiment includes checking multiple modules or multiple tests at a time. Another embodiment includes checking regression tests against files and changes that were found to have caused earlier tests to regress, as a change that causes a regression in one test often causes regressions in other tests. In another embodiment, the set and file removal stage could use a "binary chop" method, whereby at each stage half the files are removed; if the test still passed the cause would be in the current version of one of the remaining files, but if the test failed then the cause would be in the current version of one of the files that was removed. This modification could reduce the number of cycles it takes to identify the change that caused the regression.

Those skilled in the art will recognize that, for simplicity and clarity, the full structure and operation of all data processing systems suitable for use with the present invention is not being depicted or described herein. Instead, only so much of a data processing system as is unique to the present invention or necessary for an understanding of the present invention is depicted and described. The remainder of the construction and operation of data processing system 100 may conform to any of the various current implementations and practices known in the art.

It is important to note that while the present invention has been described in the context of a fully functional system, those skilled in the art will appreciate that at least portions of the mechanism of the present invention are capable of being distributed in the form of a instructions contained within a machine usable medium in any of a variety of forms, and that the present invention applies equally regardless of the particular type of instruction or signal bearing medium utilized to actually carry out the distribution. Examples of machine usable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present invention has been described in detail, those skilled in the art will understand that various changes, substitutions, variations, and improvements of the invention disclosed herein may be made without departing from the spirit and scope of the invention in its broadest form.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC §112 unless the exact words "means for" are followed by a participle.

What is claimed is:

1. A method for identifying defective program code, comprising:
   providing a verified program code having a plurality of verified program components and a modified program code having a plurality of modified program components, wherein at least one of the modified program components is defective, causing the modified program code to be defective;
   creating a test program code corresponding to the modified program code, wherein one of the modified program components is replaced with a corresponding one of the verified program components to determine if the replaced modified program component is defective;
   testing the test program code; and
   designating the replaced modified program component as defective according to the results of the test.

2. The method of claim 1, wherein the verified program code, the modified program code, and the test program code are dynamic link libraries.

3. The method of claim 1, further comprising testing the verified program code and the modified program code.

4. The method of claim 1, wherein the creating and designating are repeated for each modified program component in the modified program code.

5. The method of claim 1, wherein the modified program components are program modules.

6. The method of claim 1, wherein the modified program components are sets of program files developed by the same individual.

7. The method of claim 1, wherein the modified program components are program files.

8. The method of claim 1, wherein the replaced modified program component is designated as defective if the test is passed.

9. A data processing system having at least a processor and accessible memory, comprising:
   means for selecting a verified program code having a plurality of verified program components and a modified program code having a plurality of modified program components, wherein at least one of the modified program components is defective, causing the modified program code to be defective;
   means for creating a test program code corresponding to the modified program code, wherein one of the modified program components is replaced with a corresponding one of the verified program components to determine if the replaced modified program component is defective;
   means for testing the test program code; and means for designating the replaced modified program component as defective according to the results of the test.

10. The data processing system of claim 9, wherein the verified program code, the modified program code, and the test program code are dynamic link libraries.

11. The data processing system of claim 9, further comprising means for testing the verified program code and the modified program code.

12. The data processing system of claim 9, wherein the modified program components are program modules.

13. The data processing system of claim 9, wherein the modified program components are sets of program files developed by the same individual.

14. The data processing system of claim 9, wherein the modified program components are program files.

15. The data processing system of claim 9, wherein the replaced modified program component is designated as defective if the test is passed.

16. A computer program product tangibly embodied in a machine-readable medium, comprising:
  instructions for selecting a verified program code having a plurality of verified program components and a modified program code having a plurality of modified program components, wherein at least one of the modified program components is defective, causing the modified program code to be defective;
  instructions for creating a test program code corresponding to the modified program code, wherein one of the modified program components is replaced with a corresponding one of the verified program components to determine if the replaced modified program component is defective;
  instructions for testing the test program code; and
  instructions for designating the replaced modified program component as defective according to the results of the test.

17. The computer program product of claim 16, wherein the verified program code, the modified program code, and the test program code are dynamic link libraries.

18. The computer program product of claim 16, further comprising instructions for testing the verified program code and the modified program code.

19. The computer program product of claim 16, wherein the modified program components are program modules.

20. The computer program product of claim 16, wherein the modified program components are sets of program files developed by the same individual.

21. The computer program product of claim 16, wherein the modified program components program files.

22. The computer program product of claim 16, wherein the replaced modified program component is designated as defective if the test is passed.

* * * * *